United States Patent [19]
Sudworth

[11] 3,765,945
[45] Oct. 16, 1973

[54] ELECTRIC CELLS AND BATTERIES
[75] Inventor: James L. Sudworth, Derby, England
[73] Assignee: British Railways Board, London, England
[22] Filed: Nov. 29, 1971
[21] Appl. No.: 202,984

[30] Foreign Application Priority Data
   Dec. 1, 1970  Great Britain.................. 57,039/70

[52] U.S. Cl.............................................. 136/83 R
[51] Int. Cl. ........................................ H01m 31/00
[58] Field of Search .................. 136/6, 83, 20, 175, 136/176

[56] References Cited
UNITED STATES PATENTS
3,413,150  11/1968  Kummer et al. ......................... 136/6
3,679,480  7/1972  Brom et al. ......................... 136/83 T
3,663,294  5/1972  Levine et al. ..................... 136/83 R

*Primary Examiner*—A. B. Curtis
*Assistant Examiner*—C. F. Lefevour
*Attorney*—Elliott I. Pollock et al.

[57] ABSTRACT

An electric cell of the kind in which the electrochemical reactants are liquid sodium as negative active material (anode) and liquid sulphur material as positive active material (cathode) and anode and cathode compartments are separated by a solid electrolyte which is a sodium ion conductor. The cell is assembled in the discharged state and the cathode compartment initially contains sodium poly-sulphide encapsulated in elemental sulphur.

2 Claims, 2 Drawing Figures

PATENTED OCT 16 1973 3,765,945

ELECTRIC CELLS AND BATTERIES

This invention relates to electric cells and batteries of the kind known as sodium-sulphur cells and batteries in which the electrochemical reactants are liquid sodium as negative active material (anode) and liquid sulphur material as the positive active material (cathode) and anode and cathode compartments are separated by a solid electrolyte which is a sodium ion conductor, such as Beta-alumina.

Hitherto an obstacle to manufacturing cells and batteries of this kind has been the difficulty in handling sodium metal. If the battery is assembled in the discharged state, i.e., using sodium poly-sulphide, this avoids the necessity of handling sodium metal.

There are however some disadvantages in using sodium polysulphide, since it is hygroscopic and if exposed to the atmosphere readily absorbs water. Such water absorption is deleterious to the performance of the battery and it is the object of the present invention to prevent this water absorption.

According to this invention, in an electric cell of the kind described, the cathode compartment initially contains sodium poly-sulphide encapsulated in elemental sulphur. Thus a skin of sulphur is formed around the sulphide to prevent water absorption.

The skin of sulphur may be formed by encapsulating the solid poly-sulphide in liquid elemental sulphur and cooling to room temperature. Preferably the cooling should be very rapid thus ensuring the formation of plastic sulphur which is less brittle than the normal forms of sulphur and will enable the resultant capsules to be handled more easily. The poly-sulphide may be impregnated into a matrix of electronically conducting material such as carbon or graphite felt prior to its encapsulation in elemental sulphur.

The invention will now be further explained by way of example with reference to the accompanying drawings in which.

Figure 1:
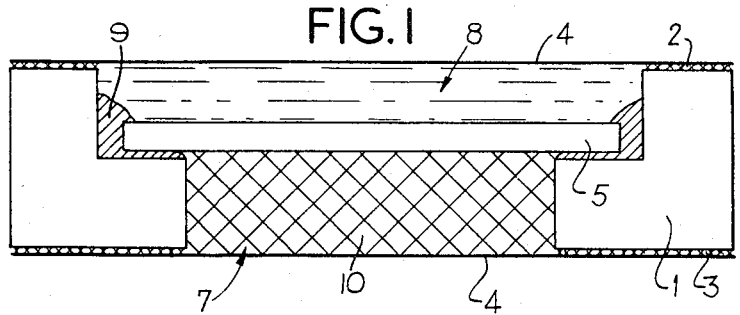
FIG. 1 shows a cross-section through one cell of a sodium sulphur battery.

The cell construction shown in the drawings comprises an annular cell body 1 to the ends of which are sealed by seals 2 and 3, plate electrodes 4. Across the cell body, intermediate its ends, is a membrane 5 constituting the solid electrolyte. Between the electrodes 4 and membrane 5 are defined compartments 7 and 8 constituting the cathode and anode compartments respectively.

The body 1 essentially acts as a cell wall and should be rigid and impermeable. It may be fabricated from a sintered alumina or any material to which plate 5 constituting a solid electrolyte membrane can be sealed and which is an electronic insulator or is so fabricated that its surface is electronically insulating. The body 1 should preferably be resistant to attack from sodium.

Plate 5 is a poly-crystalline material comprising a structural lattice and sodium ions which are mobile with respect to the lattice. Plate 5 is attached to body 1 by means of an impermeable seal 9 which can be a glass (preferably resistant to sodium and sulphur) and which is compatible with plate 5 and holder 1. When holder 5 is fabricated from sintered alumina, Kovar glass has been found to be suitable. Plates 4 are electronically conducting diaphragms which are preferably resistant to the attack of sodium and sulphur.

The plates 4 are sealed to the body 1 by seals 2 and 3 which may be compression seals incorporating a gasket or 'O' ring of compressible material which is preferably not attacked by sodium. For example an aluminium 'O' ring or a graphite gasket (such as Grafoil) may be used. Alternatively seals 2 and 3 may be hermetic seals which are preferably resistant to sodium metal.

In one experimental cell construction as shown in FIG. 1, the plate 5 was a Beta-alumina plate 1.5 mm thick, the anode compartment 8 was 4.5 mm deep and 35 mm in diameter and the cathode compartment was 2.6 mm deep and 22 mm in diameter. The plates 4 were of stainless steel sheet 0.13 mm thick.

To form a battery, a plurality of the cells are stacked end-to-end. Conveniently, the plate electrodes 4 which are intermediate the cells of the stack can serve as common electrodes for two adjacent cells. Thus between each two adjacent cells only a single plate electrode 4 is provided.

The compartment 7 is filled initially with sodium polysulphide so that it is unnecessary to fill compartment 8 with sodium metal provided that an electronic path (not shown) exists between plate 5 and plate 4 of compartment 8. Sodium metal is generated in compartment 8 by electrolysis after heating the cell to a temperature greater than the melting point of the sodium poly-sulphide in compartment 7.

To provide an electronically conducting path between the electrolyte membrane 5 and the electrode 4 associated with compartment 7, a matrix of carbon or graphite felt is provided into which the sodium poly-sulphide is impregnated. The carbon or graphite felt is compressed by a factor of up to 4:1 between the membrane 5 and electrode 4.

Figure 2:
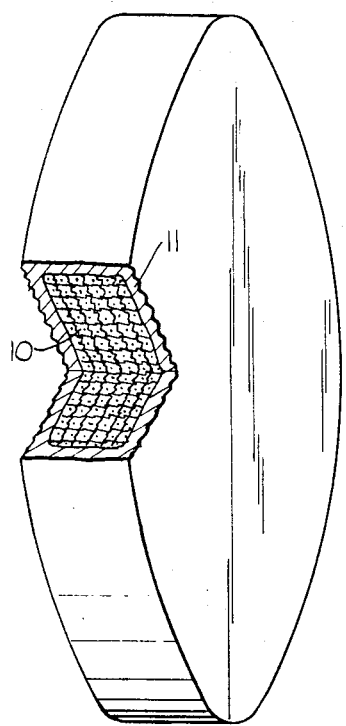
FIG. 2 shows in perspective view a disc incorporating the sodium poly-sulphide and fitted into the cathode compartment during the construction of the cell.

To facilitate handling of the sodium poly-sulphide, which is hygroscopic and easily oxidised, the matrix after impregnation with molten sodium poly-sulphide is allowed to solidify and the resultant composite is then coated with elemental sulphur either in the liquid or vapour phase. When the composite is then cooled a skin of elemental sulphur is formed to protect the poly-sulphide from atmospheric attack. The result is a capsule of disc form as shown in FIG. 2 where the poly-sulphide impregnated felt matrix is shown at 10 and the layer of sulphur at 11.

I claim

1. A method of manufacturing an electric cell of the kind in which the electrochemical reactants are liquid sodium as negative active material (anode) and liquid sulphur material as positive active material (cathode) and anode and cathode compartments are separated by a solid electrolyte which is a sodium ion conductor, the method comprising encapsulating sodium poly-sulphide in elemental sulphur, housing the capsule so formed in the cathode compartment, heating the cell to liquify the elemental sulphur and sodium poly-sulphide, and generating sodium in the anode compartment by electrolysis.

2. A method of manufacturing an electric cell according to claim 1, wherein the sodium poly-sulphide is impregnated into a matrix of electronically conducting material prior to it being encapsulated in the elemental sulphur.

* * * * *